Aug. 26, 1969   P. L. ANDERSON   3,462,912
ORIENTOR FOR CANS TO BE LOADED INTO CASES
Filed July 19, 1967   6 Sheets-Sheet 1

INVENTOR.
PAUL L. ANDERSON
BY
Dugger Peterson Johnson + Westman
ATTORNEYS

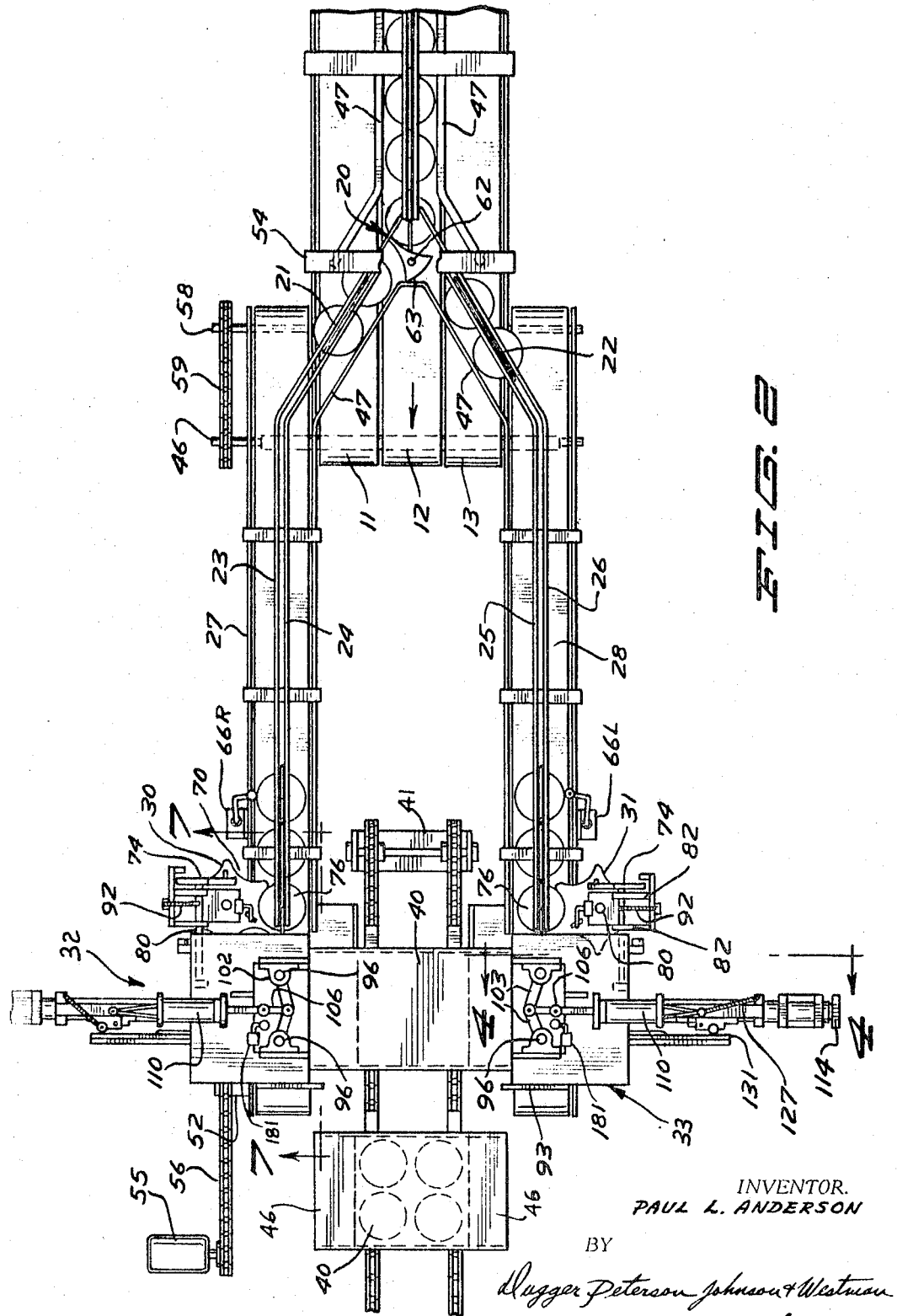

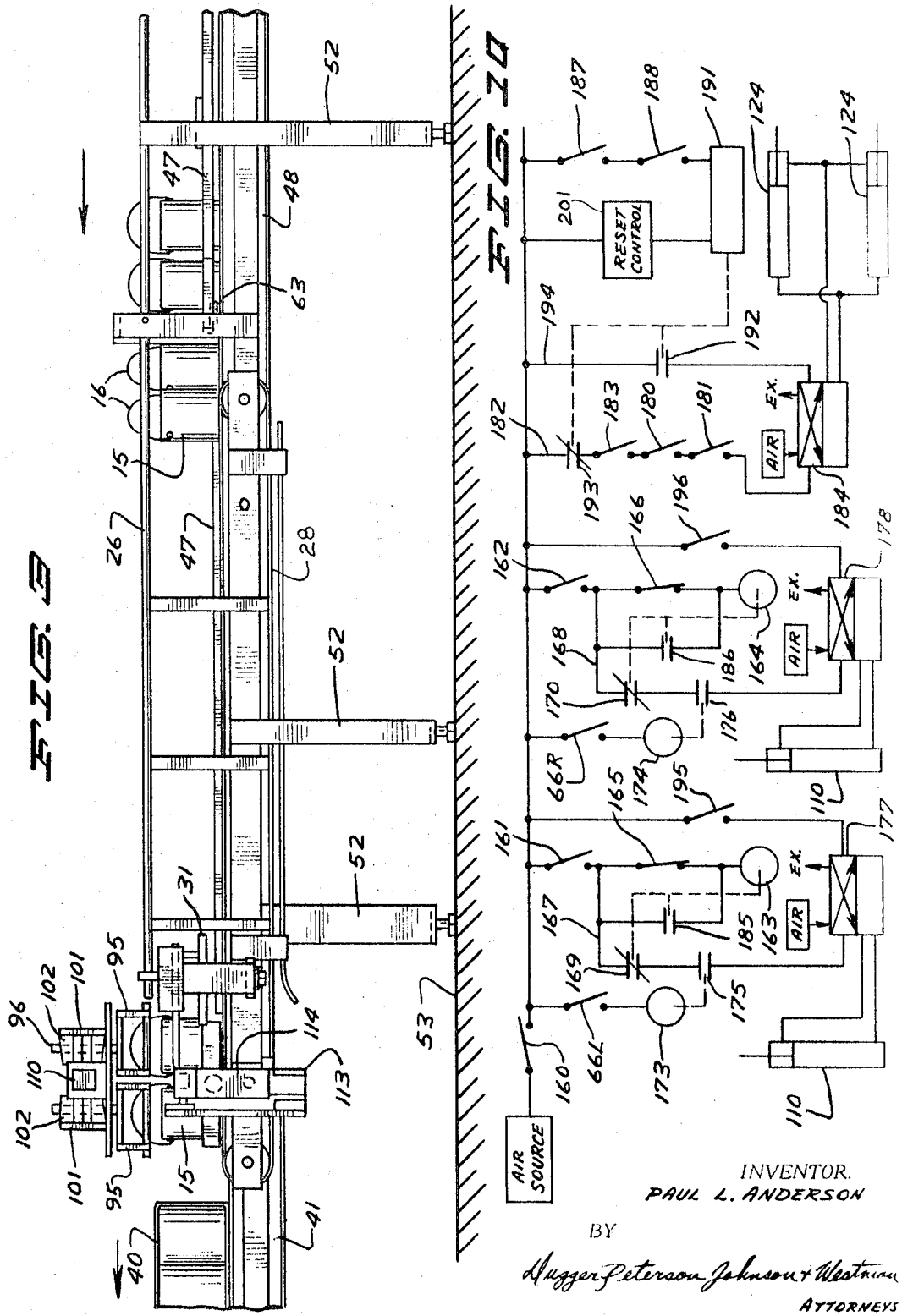

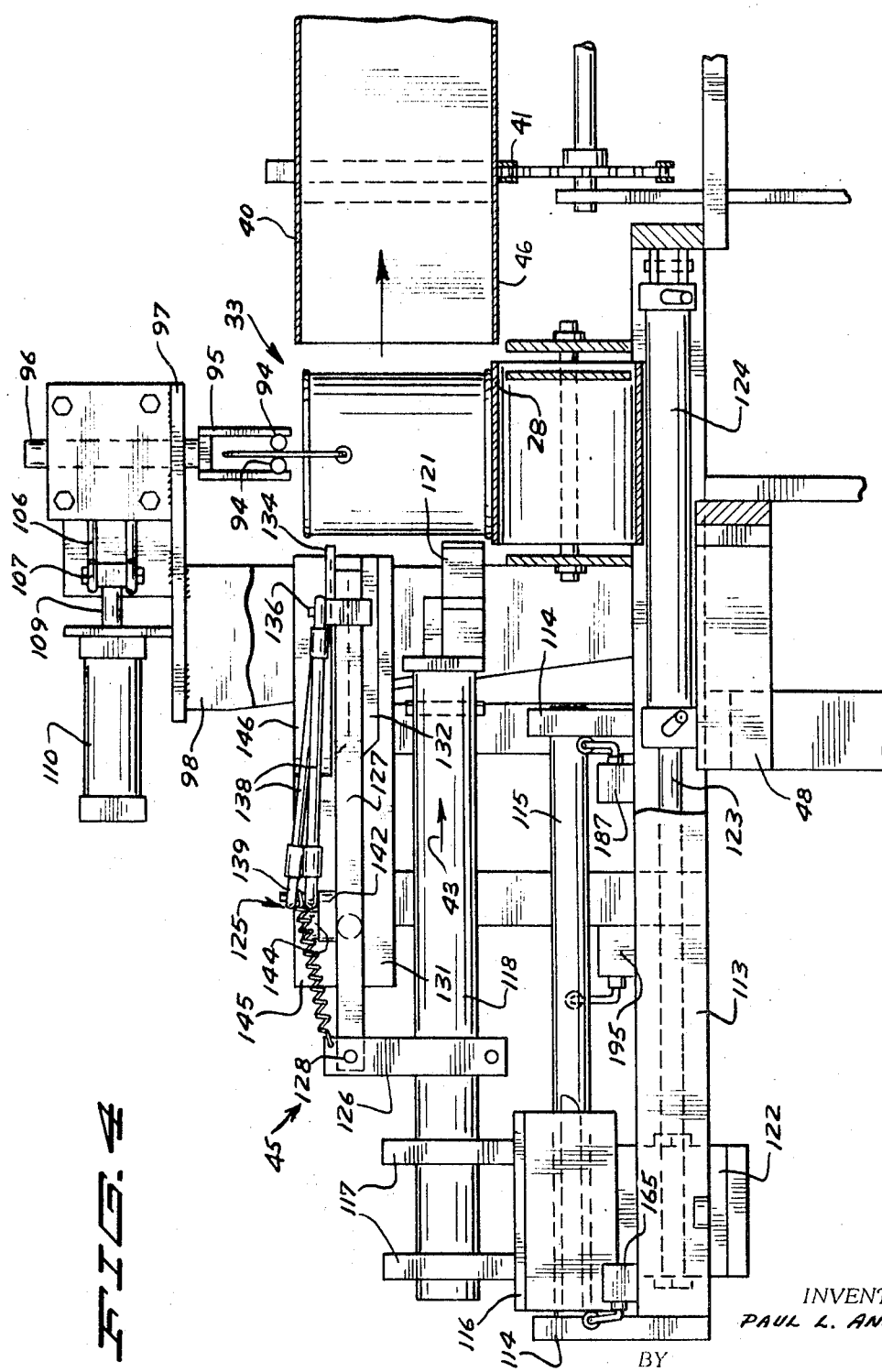

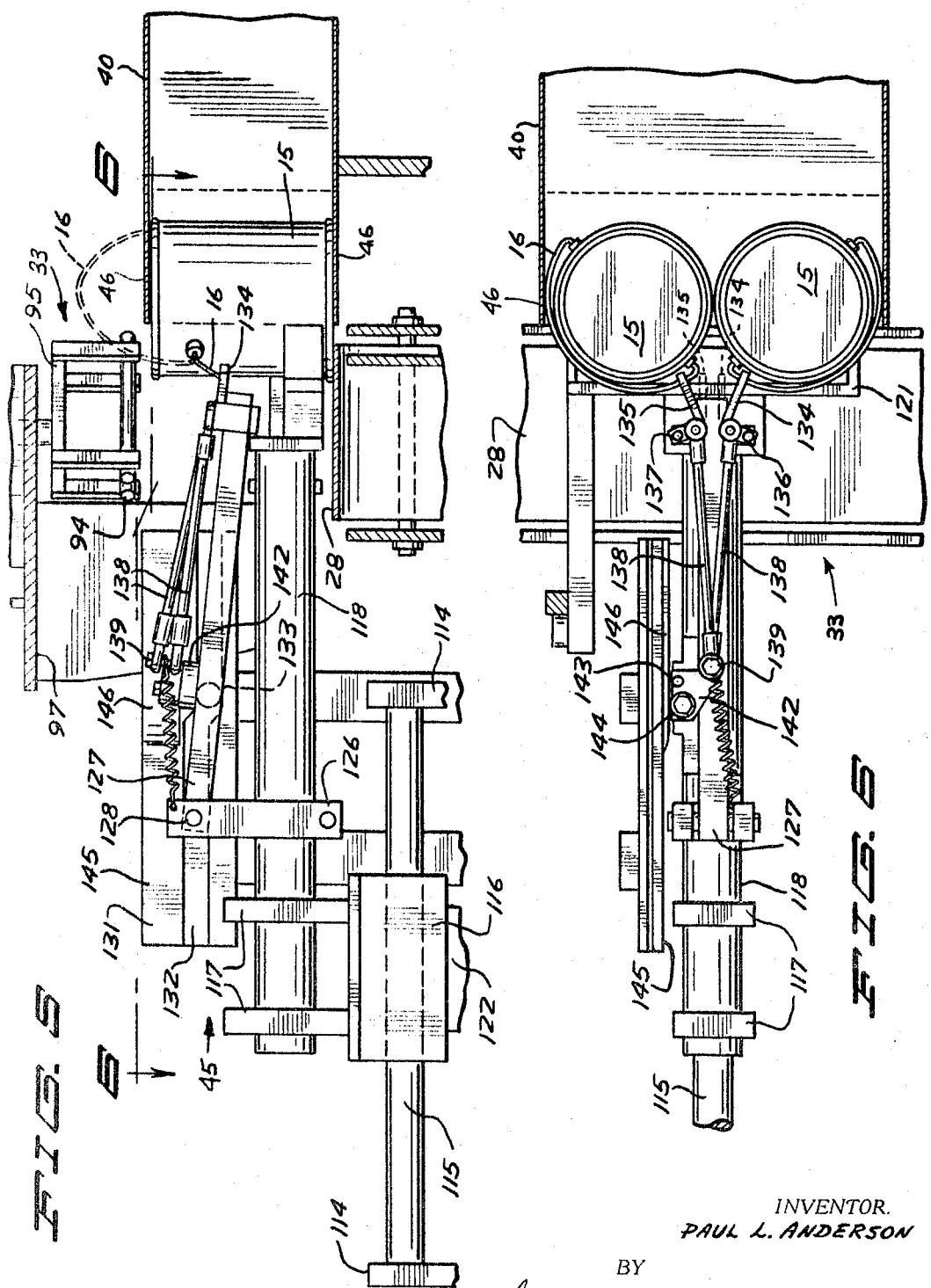

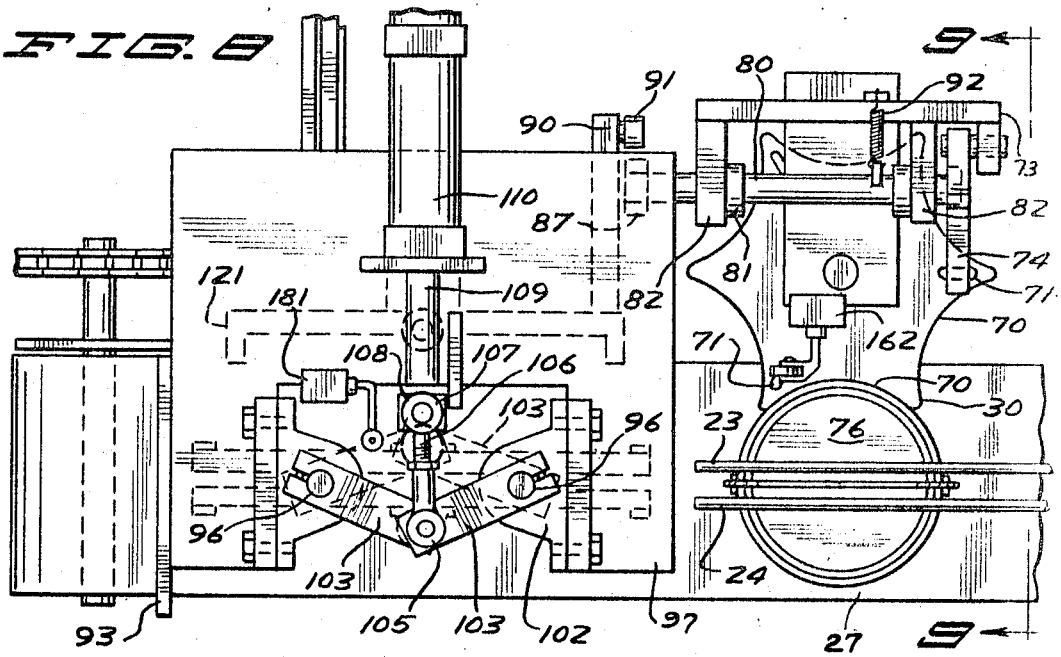
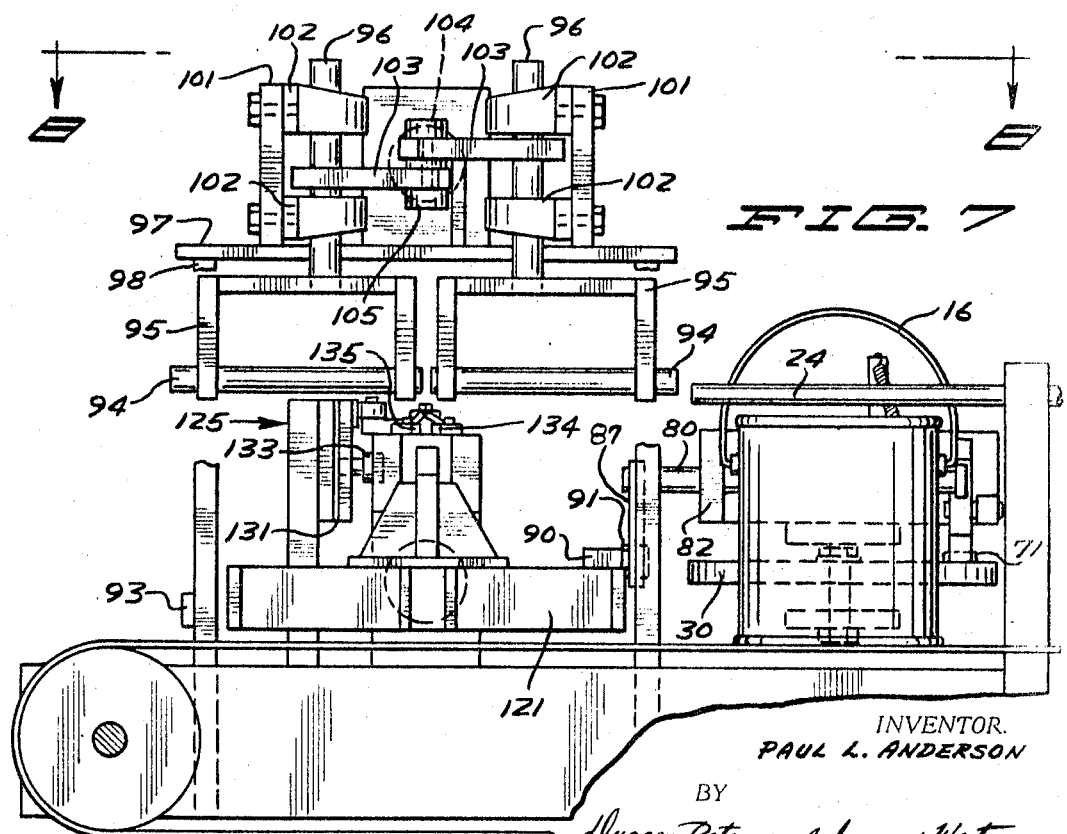

United States Patent Office 3,462,912
Patented Aug. 26, 1969

3,462,912
ORIENTOR FOR CANS TO BE LOADED
INTO CASES
Paul L. Anderson, Plymouth Village, Minn., assignor to
Cherry-Burrell Corporation, Minneapolis, Minn., a corporation of Delaware
Filed July 19, 1967, Ser. No. 654,506
Int. Cl. B65b 35/54, 61/00, 17/00
U.S. Cl. 53—159                                    12 Claims

ABSTRACT OF THE DISCLOSURE

A machine to receive cans, primarily gallon cans, which have bails or wire handles inserted thereon and pack them into cases. The bails are guided between two guide rails which keep all of the cans in the same orientation with the bails upright and in a plane parallel to the direction of travel to a loading station. In the loading station, the bail guide rails have movable sections each of which is of size to receive and hold the bail from one of the cans in the loading station. The sections of guide rails are then twisted 45° to in turn twist the cans so that their bails are properly oriented for packing into a shipping case.

BACKGROUND OF THE INVENTION

Field of the invention

The present invention relates to machines which can be used for orienting or arranging units, such as cans, so that the handles or bails on the cans are properly oriented and then the cans are placed into cases.

Discussion of the prior art

In the prior art there are machines which will orient cans having bails properly for packing into cases. These previous machines operate on a principle wherein the cans are rotated to orient the bails by gripping the can itself and rotating the can as it moved. In the present device, the structure is simplier, takes less space, and is more positive because the rotation of the can is done by holding the bail itself and rotating it while the bail is in an upright position. Further, space is saved because the shipping case is dropped in between the two lanes of cans and the case packing is done at a direction transverse to the direction of conveying of the cans in the orienting unit.

The unit is thus less complex, more positive in its orienting, and takes a great deal less space than previous bail orientors.

SUMMARY OF THE INVENTION

The invention herein relates to a machine that orients the bails and bail ears of cans through the use of movable sections of guide rails which guide the bails from the cans and which can be twisted to orient the cans properly for loading into cases. The invention further includes placing the case into which the cans are to be loaded between two parallel lanes of cans each having a loading station and moving the properly oriented cans from each of the loading stations toward the other into the centrally located shipping case.

BRIEF DESCRIPTION OF THE DRAWINGS

FIGURE 2 is a top plan view of the device shown schematically in FIGURE 1;

FIGURE 3 is a side elevational view of the can orientor of FIGURE 2;

FIGURE 4 is an enlarged sectional view taken as on line 4—4 in FIGURE 2;

FIGURE 5 is a fragmentary enlarged view of a can loading pusher made according to the present invention;

FIGURE 6 is a view taken as on line 6—6 in FIGURE 5;

FIGURE 7 is a sectional view taken as on line 7—7 in FIGURE 2;

FIGURE 8 is a plan view taken as on line 8—8 in FIGURE 7;

FIGURE 10 is a schematic representation of the controls for the device of the present invention.

DESCRIPTION OF THE PREFERRED EMBODIMENT

General machine construction

Figure 1:
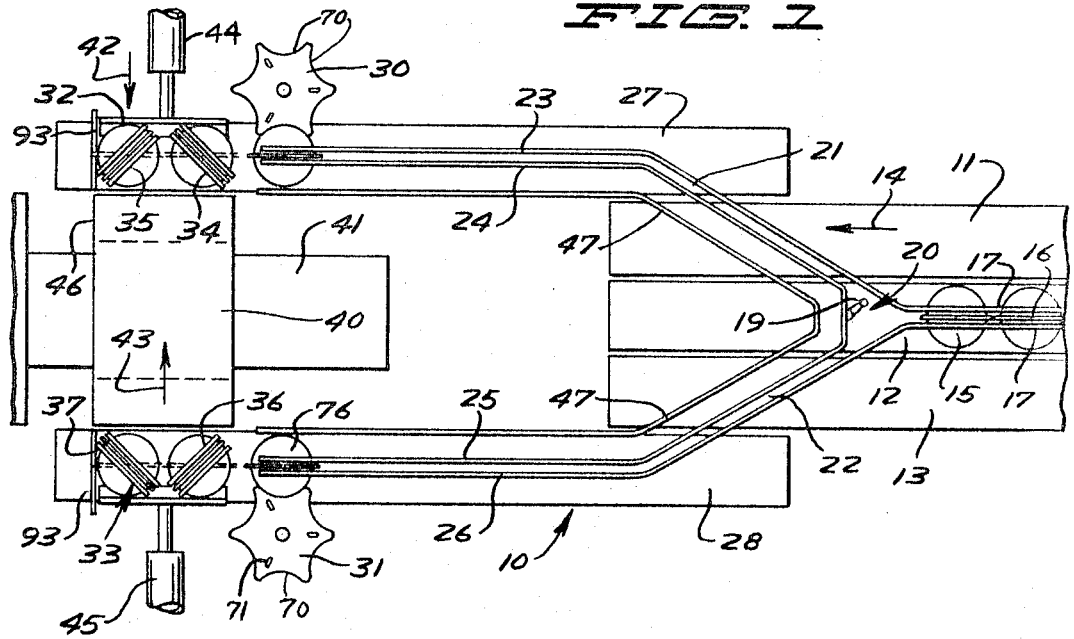
FIGURE 1 is a top schematic view of a can orientor machine made according to the present invention.

Referring to the drawings and the numerals of reference thereon, a machine for orienting cans having wire handles or bails is illustrated generally at 10 and as shown schematically in FIGURE 1, includes a plurality of infeed conveyors 11, 12 and 13 which are positioned side by side as shown and convey in direction as indicated by the arrow 14. These conveyors, particularly the center conveyor 12 at the initial stages, receive cans or other objects 15 which are to be oriented properly. The cans 15 have bails or handles 16 mounted thereon in provided ears positioned on opposite sides of the can. The bails 16 are installed on the cans 15 in an automatic machine and are received from this machine by the center conveyor 12. A pair of center guide rails 17, 17 are positioned above the conveyor 12 and are spaced apart a distance sufficient to receive the bail 16 from the cans 15 as they come from the machine which installs the bails. The cans are thus conveyed in direction as indicated by arrow 14 until they come to a divider station 20 which has a small divider finger 19 operated as will be further explained. This divider finger and mechanism then takes alternate cans and deflects the cans and bails so that one of the cans will go into a first lane 21 and the next can will go into the second lane 22. The cans are guided by guide bars mounted over the conveyors. The bails will be guided in each of these lanes in guide rails 23 and 24 in lane 21 and guide rails 25 and 26 in lane 22.

In the first sections of lanes 21 and 22, the conveyors 11 and 13 respectively, will attempt to move the cans in direction as indicated by arrow 14, but the guide bars and guide rails will prevent such movement and thus the cans will be conveyed at an angle along the guide bars and rails of lanes 21 and 22 until they hit their outside conveyors 27 and 28 respectively. The cans are then conveyed by the conveyors 27 and 28 in the same direction as that indicated by arrow 14 to a star wheel can counting mechanism 30 and 31, one on each side of the machine, or one for each of the lanes. It is to be understood that each of the lanes here is identically constructed except one is right hand and one left hand, and that the discussion will deal with largely one side. The other side operates exactly in the same manner except the parts are reversed.

The star wheels 30 and 31 are set up so that they will let two cans 15 pass before the star wheels stop and hold the cans in each lane. This is shown schematically in FIGURE 1. The two cans that are passed by the star wheels then are carried to loading stations 32 and 33 respectively. The bails 16 of these cans 15 in each of the loading stations are positioned between short movable guide rail sections 34 and 35 at loading station 32 and sections 36 and 37 at loading station 33. A shipping case 40 is positioned between the station 32 and 33 (the stations are spaced apart sufficiently far to receive the case).

The case is mounted on separate conveyor means 41 which will receive the directed cartons or cases and after they are filled will convey them out of the way. The case erecting and depositing machine is not shown in the present invention because they can be of conventional design which will deposit the cases in the center, hold them open at both ends for loading, and convey them out after they are filled. One such machine that works well is the automatic case packer made by Thiele Engineering Division of the Cherry-Burrell Corporation, Minneapolis, Minn. The cases could be erected in any suitable manner, even manually.

After the cans are positioned in the movable sections of guide rail at the loading stations 33 and 32, and the case 40 is properly positioned, the movable guide sections at each of the loading stations are twisted 45° as shown in solid lines. These movable sections are twisted about an upright axis and this in turn twists the cans so that the bail 16 on each of the cans is positioned at 45° with respect to its original direction of travel and is positioned at 45° with respect to the transverse axis of the case 40. Then the cans are pushed inwardly in direction as indicated by the arrows 42 and 43, respectively, by loading pushers illustrated schematically at 44 and 45, respectively. The cans are inserted into the cases from opposite ends of the case, and at the same time the bails are guided downwardly so that they rest against the sides of the cans. After the loading pushers 44 and 45 have pushed the cans into the case, the case 40 is conveyed away and the flaps 46, 46 at opposite ends of the case are closed in a conventional manner and the product is shipped.

Once the loading pushers have retracted part way, suitable mechanism is actuated to permit the star wheels 30 and 31 to let two more cans pass into the stations 32 and 33 so that they are held by the movable guide rails, 34, 35 and 36, 37.

Referring to FIGURES 2 and 3, specifically, the actual construction of the machine is shown. As shown, the conveyors 11, 12 and 13 are driven from a common shaft 46. The conveyors themselves are mounted onto a frame 48 which in turn is mounted on legs 52 so that it is supported on the floor 53. Guide bars 47 are mounted with respect to the frame with suitable members 54 and guide the cans for sliding movement along the machine so the cans stay on the conveyor.

The conveyors 27 and 28 are driven from a common power source comprising a motor 55 driving through a chain 56 to a shaft and sprocket 57 at the loading station end of the conveyor 27. At the opposite end of conveyor 27, a shaft 58 is provided and this shaft 58 in turn drives through chain and sprockets 59 to shaft 46. The shaft 58 extends across the frame and in turn drives conveyor 28. The divider finger of the divider station 20 is mounted onto an upright shaft 62 which is mounted in suitable bearings and pivots about its upright axis. The finger 19 is mounted on the shaft adjacent the top and a small rocker cam member 63 is mounted near the bottom. The cam member is mounted and made so that when one can 15 comes into the divider station 20, the cam will rock about the axis of shaft 62 and divert that can into lane 21. This will set the cam so the next can will be intercepted in the divider station 20 and when the next can 15 in line strikes the cam, the cam will rock about the axis of shaft 62 in opposite direction and will turn that can 15 into the lane 22. The finger 19 strikes the bail of the can being diverted during each swing of the cam so that the bail is diverted into the proper lane. Thus the divider station is a simple can operated rocker cam with a bail deflecting finger that will automatically alternate the cans between the two lanes 21 and 22. Any suitable mechanism can be employed and two entirely separate feeding lanes could be used, if desired.

It should be noted that the rails 23 and 24 and 25 and 26 are positioned slightly out of line with each other in horizontal plane at the portions that diverge outwardly from divider station 20. This is to insure that the bails will not slip out of the way under the action of the conveyors 11 and 13. The cans have to slide transversely across the conveyors at the same time they are moving forwardly in the guide, so that the rails and bar 47 are positioned to accomplish this purpose.

In the operation of the machine, first there is a surge switch 66 at each of the lanes of cans. This is positioned to sense the third can back from the star wheel assemblies 30 and 31 respectively. This is to insure that the unit will not recycle unless and until there are a sufficient number of cans so that the unit will again be loaded after the case in the machine has been filled. This is more fully explained in connection with the controls.

Star wheel assemblies

The star wheels 30 and 31 are operated by the loading pushers 44, 45 as they are being retracted to a home position after they have packed cans into the case 40. The star wheel latches are mechanically operated releases and are perhaps best shown in FIGURES 7, 8 and 9. The star wheels 30 and 31 are identically constructed and again, the same numbers will be applied to the parts on each side of the conveyor or at each station. The parts will be reversed for left and right hand operation.

Figure 9:
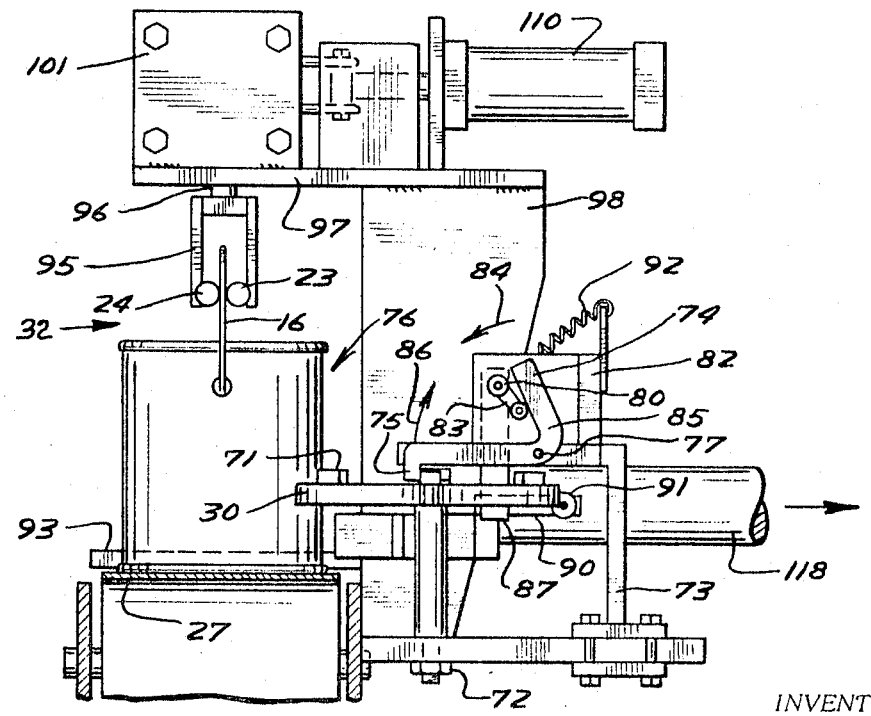
FIGURE 9 is a sectional view taken as on line 9—9 in FIGURE 8.

Each of the star wheels 30 and 31 comprises a wheel having six pockets or part circular indentations 70 defined in the outer periphery thereof. On the top surface of each star wheel there are three lugs 71 attached thereto. The lugs 71 are positioned so that the space between adjacent lugs corresponds to two of the pockets 70. The star wheels are mounted onto bolts 72 that pass through bearings in the center of the star wheels and are attached to arms extending from the frame 48. The star wheels are freely rotatably mounted on these bolts, and if desired, can be mounted onto shafts or other suitable mounting members. The rotation of each star wheel is done by the cans passing along the conveyors 27 and 28, respectively. The cans coming along the conveyors will be guided by the respective guide rails so that they engage the pockets 70 of the wheels and cause the star wheels to rotate. Each star wheel is held from rotating at preselected intervals through the use of a bell crank type latch 74 that has a dog 75 which extends down and will interfere with and engage one of the stops or lugs 71 mounted to the top surface of each of the star wheels. When the latch is in position as shown in FIGURE 9 engaging one of the lugs 71, the can 76 in a pocket 70 of the star wheel will be held from further movement by the conveyor supporting the cans. The conveyor will slip underneath the cans while the cans merely ride along the top of the conveyor. The cans coming along the conveyor thus will be held by the key can 76 in position at the star wheel and will not advance until the latch 74 is released.

The latch 74 is pivotally mounted as at 77 to a bracket 73 which is fixed to the arm supporting bolt 72 and is positioned above the star wheel. A cross shaft 80 is pivotally mounted in suitable bearings 81 which in turn are mounted to brackets 82 having two spaced apart plates and which are attached to the bracket 73. The cross shaft has an arm 83 drivably mounted onto one end thereof and the arm 83 has a roller end and is aligned with the latch 74 so that upon movement of the shaft 80 in rotational direction indicated by arrow 84 the roller at the end of the arm 83 will strike an actuator section 85 of the latch 74 and will cause the latch to rotate in direction as indicated by arrow 86 about its axis 77 and this will cause the dog 75 to lift clear of the lug 71 and release the star wheel. The shaft 80 is actuated by a second lever 87 drivably mounted at the opposite end of the shaft from the arm 80 and extending downwardly. The lever 87 is positioned so that it will be contacted by a cam follower section 90 that is attached to the loading pusher assembly 44 (or 45). The cam follower 90 has a roller 91 that engages and operates the lever 87 as the pusher assemblies are retracted.

It will be noted that when each pusher assembly moves inwardly toward the cans in direction as indicated by the arrows in FIGURE 1, the roller 91 will strike the lever 87 causing the shaft 80 to rotate in direction opposite that indicated by arrow 84. When the shaft 80 rotates in this opposite direction, the arm 83 does not strike anything and the roller 91 will move past the arm permitting the arm to be returned to its neutral position by a control spring 92. Then, when each loading pusher goes back to its home position, the roller 91 will again contact the lever 87 and will cause the shaft 80 to rotate in direction as indicated by 84, releasing the latch 74 as previously described and letting the conveyors 27 and 28 move some more cans into the loading stations because the star wheels will be permitted to rotate two sections permitting two more cans to be passed into the loading stations. The roller 91 will move past the lever 87 and the spring 92 will return the lever to its neutral position permitting the latch 74 and dog 75 to drop down onto the surface of the star wheel and engage the next lug 71 to hold the star wheel once more. Both latches operate at the same time and in the same way.

Can orientor assemblies

Now, assuming that two cans have moved into each of the loading stations 32 and 33, it will be seen that these cans are held from movement along the conveyors by a stop member 93 on each side of the unit that is fastened with respect to the frame and holds the two first cans in position under the movable guide rail sections 35 and 37. The second can then abuts against the first can. The actuating mechanism from the guide rail sections on each of the loading stations is identical and only one side will be described. The other side is the same except it is reversed. Each of the guide rail sections include a pair of spaced apart parallel rail members 94, 94 mounted onto a rail support assembly 95 that hold the rails 94, 94 properly oriented. The rail support assembly 95 includes a shaft 96 that extends upwardly and passes through a support plate 97 that in turn is mounted with suitable members 98 to the frame 48. Upright standards 101 are attached to the support plate 97 and these standards are spaced apart and aligned. The standards are used for mounting spaced apart bearings 102, which are vertically spaced and two of the bearings 102 in turn house one of the shafts 96. The shafts thus can rotate in the bearings. The shaft 96 for each of the movable sections, has a control arm 103 attached thereto so that it will rotate with the shaft. The control arms 103 for the movable guide rail sections on each of the loading stations are vertically shifted so that they do not interfere with each other. The control arms 103 are mounted at their outer ends to a common drive pin shown in dotted lines at 104 that in turn is attached to upper and lower rod end bearings 105. The rod end bearings are attached to rods 106 that have opposite rod end bearings 107 in turn attached to a block 108 that is fastened to the outer end of a piston rod 109 of cylinder-piston assembly 110. The cylinder-piston assembly comprises a double acting cylinder which exerts force in either direction on the rod 109 so that the rod can be extended or retracted for actuation. The cylinder 110 is mounted onto suitable support members and is usually an air cylinder.

When the unit is at position shown in full lines in FIGURE 8, the rods or rail members 94, 94 are parallel with and aligned with the guide rails for each of the conveyors 27 and 28 so that when the cans are released by the star wheel they will move forwardly under force of the conveyor and the bails 16 on the cans 15 will pass between the rails 94, 94 in the movable sections. After they are properly positioned, the piston cylinder assembly will be energized and will retract the piston rod 109 so that the arms 103, 103 move to position as shown in dotted lines in FIGURE 8. This will cause the shafts 96, 96 to twist about their axes and in turn will cause the rails 94, 94 to also twist through an angle of 45° thereby twisting the cans so that the bails are oriented at a 45° angle with respect to the direction of movement of the conveyors 27 and 28 and also with respect to the transverse axis of the shipping case 40 positioned between the loading stations.

The shipping case 40 will be fully erected with its flaps 46, 46 extending outwardly (both ends open) and held in position through suitable mechanism between the loading station. Once the cans are properly oriented so that the shiftable rail members have rotated at 45° of rotation, the cans are ready to be moved transversely to the direction of the conveyors 27 and 28 into the case positioned between these two loading stations. the cans are moved into the case through the use of the loading pusher assembly 44 and 45, one at each of the loading stations. The loading pusher assemblies are perhaps best seen in FIGURES 4, 5, 6 and 7. The loading pusher assemblies are the same construction on each side and the discussion will deal with only one side of the unit.

Loading pusher assemblies

A sturdy transverse support member 113 is attached to the frame 48 adjacent each of the loading stations and extends transversely to the longitudinal direction of the conveyors. The support member 113 in turn has upright brackets 114 that are used to support a guide shaft 115 that has a longitudinal axis at right angles to the direction of the conveyor and parallel to the direction of movement of the cans when they are put into the case 40. The guide shaft in turn has a slidable carriage 116 mounted thereon. The carriage has a pair of upright supports 117 at the upper side thereof that in turn mount a pusher tube 118. The tube 118 has a pusher plate 121 attached thereto and the plate is aligned with the loading station. The carriage 116 also has a downwardly extending member 122 which is connected to piston rod 123 extending from a cylinder-piston assembly 124 that in turn is mounted with respect to the frame 48. The rod 123 will extend and retract, and when it is retracted, will move the carriage 116 and the pusher assemblies in directions as indicated by the arrows 42 and 43 in FIGURE 1. This will cause the pusher plate 121 of each pusher assembly to engage the cans aligned with it and move the cans from each of the loading stations centrally and toward and into the case. After the cans have been rotated 45° to properly orient the bails and bail ears as previously described, the cylinder 124 is energized and the pusher assemblies are moved so that they start moving the cans in toward the case positioned in the center of the unit. In order to get the cans in the case, of course, the bails have to be moved to position against the sides of the cans. The mechanism for doing this is termed the bail dropping mechanism and is illustrated generally at 125. It moves with the pusher assemblies. The bail dropping mechanism includes a clamp 126 that is fixedly attached to the tube 118 and extends upwardly therefrom. The clamp 126 in turn mounts a bail dropping arm 127 which is pivotally mounted as at 128 to the clamp 126. The arm is then positioned above and extends parallel to the tube 118. The movement of the arm 127 about its pivotal axis 128, which is substantially horizontal, is controlled by a guide cam 131. The guide cam 131 has a cam track 132 defined therein and a cam follower roller 133 is attached to the arm 127. The roller 133 moves in cam slot 132 and controls the vertical position of the outer end of arm 127. In addition, each of the arms has two bail control or guide finger assemblies which make sure that the bails drop in the proper direction with respect to the case as the unit is moved in. These bail control fingers are shown perhaps best in FIGURES 5 and 6. As shown in FIGURE 6, the fingers 134 and 135 are both L-shaped and are pivotally mounted as at 136 and 137, respectively, to brackets extending outwardly from the arm 127. A pair of control rods 138 are used for controlling the movement of these fingers about their pivotal axes 136 and 137. Each of the rods 138 are attached to its L shaped finger at the junction of the two legs of the L, as shown, and extend away from the outer end of the arm 127 to a common attachment bolt 139. The bolt 139 pivotally joins the ends of the rods 138 to a bell crank 142 that is pivotally mounted about an axis 143 to an extension of the arm 127 as well. The bell crank in turn has a cam follower roller 144 that rides against the face of the guide cam 131 and controls the position of the outer legs of the fingers 134 and 135. When the pusher assembly is in its loading position as shown in FIGURE 4, the roller 144 rides against the flat surface 145 of guide cam 131 (FIGURE 6) and the fingers 134 and 135 are close together and substantially parallel as shown by dotted lines in FIGURE 6. At the same time, the roller 133 is in the rear portion of the track 132 and is holding the arm 127 substantially horizontal, as shown in FIGURE 4. As the carriage 116 advances to push the cans on the loading station into the case, the pusher plate 121 on each loading station will contact the cans in the station and the cans will be slid outwardly from under the movable sections of the guide rails. This will cause the bails to tend to slide out of the guide rails and start to tilt downwardly. As the pusher progresses, the roller 144 will hit a cam rail 146 and this will cause the bell crank 142 to actuate the rods 138 and spread the fingers 134 and 135 apart so that they engage the bails of the two cans in that loading station. Then, as the pusher progresses and is moving the cans inwardly toward the case 40, the cam track 132 drops as shown in FIGURE 5 and this will cause the arm 127 to drop downwardly and pull the bails down against the sides of the cans and hold them there while the cans are shoved into the case. This insures that the bails are held tightly against the sides of the cans and the cans will then fit into the case. The pusher assemblies are then retracted. Once the case is loaded, it is removed by the conveyor 41 and is closed in a conventional manner. A new case is erected and set in place between the loading station as the pushers retract. Thus it is to be remembered, as the plungers retract they trip their respective levers 87 releasing the latches for the star wheels and permitting two more cans to pass into each of the loading stations. Also, the pushers actuate suitable controls to return the movable guide rails sections to their normal position parallel to the guide rails at the star wheels prior to releasing the star wheels.

The unit will not recycle unless a sufficient number of cans move into place in back of the cans 76 at the star wheel so that the switch 66 is operated. If the switch 66 is not operated, then the unit will not cycle a second time.

It should be noted that when the pusher retracts, a spring returns the bell crank 142 to its original position so that the fingers 134 and 135 go back to their parallel position.

Control and operation

Referring to FIGURE 10, a schematic representation which represents a pneumatic or air operated control system shows the controls of the present invention. The single line representation of air lines is made for convenience. An electrical equivalent circuit will also work, but the pneumatic form is explosion proof.

At the present time, there are valves on the marker which are called limit valves made by Numatics, Highland, Mich., which operate much like a limit switch in electricity, in other words, a small actuator will close the valve of a normally open valve or will open the valve of a normally closed valve. Also, there are pneumatic relay valves made by this same company which will close small valves in the air line and these are represented in the present drawings much the same as contacts in electrical systems except they are valve closures instead of electrical contacts. The lines are for control air flow which operate pilot operated valves. The pilot operated valves direct air from separate sources to the cylinder used. The pilot operated valves are made by Allen Air Company, Mineola, N.Y.

First there is a main control valve 160 which opens the control lines from a suitable air source. The surge switches 66R, 66L must also be closed by the third can back from the star wheel. For convenience of illustration, the surge switches are labeled 66L and 66R in the schematic diagram, L for being the left side and R for the right side.

It will be remembered that as described previously, when the loading pushers retracted, they released the star wheels on each conveyor so that two cans from each conveyor would enter into the orientors or movable rail sections at the loading stations.

When the star wheels stop, they will close pneumatic valves 161 for the left star wheel and 162 for the right star wheel. This will partially complete a circuit to relay valves 163 and 164 (one for each conveyor).

Also, there are limit valves 165 and 166 which are normally closed and which are operated or opened when the loading pushers are fully retracted. Limit valve 165 is for the left loading pusher and 166 is operated by the right loading pusher. Assuming that the limit valves 165 and 166 are open or in other words, the loading pushers are fully retracted, and assuming that the valves 161 and 162 have been closed by the star wheels at their home or dwell positions, meaning that two cans have passed into the movable portions of the bail guides so that they are in the orientors, or loading stations, a pneumatic circuit will be completed through the valves 161, 162 to lines 167 and 168 respectively. These lines are connected to normally closed valves 169 and 170, respectively.

The closing of valves 66L and 66R which is done when the cans are backed up on the conveyor lines behind the star wheels, energizes time delay relays 173 and 174, respectively. After a preset time, which is sufficient to insure that the loading pushers return to their home positions and open the switches 165 and 166 (the release for the star wheels is operated by the loading pushers on the return stroke), the pneumatic time delay relays 173 and 174 close normally open valves 175 and 176, respectively, which complete the pneumatic circuit through the lines 167 and 168 and normally closed valves 169 and 170 to pilot operated valves 177 and 178. These pilot valves direct air from a source to operate the cylinders 110 (one on each of the machine) for rotating the cans about their upright axis to orient the bails properly. When the orientors have turned fully, they actuate limit valves 180 and 181 to closed position. Limit valves 180 and 181 are located in a line 182 which directs air to operate the pilot valves for the loading pusher cylinders 124. This line 182 also has a limit valve 183 in the line, which is closed when a case or carton 40 is fully erected in its position between the loading stations on conveyor 41. This limit valve can also be tied into an automatic erecting machine so that when the carton is fully erected the valve 183 is closed. This will complete the pneumatic circuit to a pilot operated valve 184 which directs air under pressure from a source to operate the cylinders 124, 124 in direction to move the pushers and push the cans in the loading stations into the case. The cylinders 124, 124 operate on a parallel basis and from the same pilot valve.

When the pushers move away from their home stations, in other words after the cylinders 124, 124 have been energized, the switches 165 and 166 will close. This will complete the circuit to relay valves 163 and 164. The relay valve 163 closes a valve 185 and opens the valve 169. The closing of valve 185 locks on the relay valve 163 through the valve 161 so that as long as the star wheel is at dwell, the relay valve 163 will be energized Also, the opening of the valve 169 disables the pilot operated valve 177 for the left orientor so that it is not energized to extend the orientor. However, the left orientors will stay in its present position until it is energized in the opposite direction.

Likewise, when the switch 166 is closed because the right pusher cylinder has moved away from its home position, the relay valve 164 is energized and this will close a relay controlled valve 186 and open the valve 170. Closing the valve 186 locks relay valve 164 on, and opening the relay valve port 170 disables the pilot operated valve 178 to the right orientors, The right orientors also remain temporarily in their turned positions.

When the loading pusher cylinders 124, 124 are fully extended, they will actuate limit valves 187 and 188 to close the circuit to a relay valve 191. The relay valve 191 closes a relay valve port 192 and opens a relay valve port 193. The opening of the port 193 disables the energizing circuit for the pushers by opening the line 182 which in turn then relaxes the pilot operated valve 184 and the closing of the valve 192 in a line 194 energizes the pilot operated valve 184 in opposite direction to return the cylinders 124, 124 to their home position.

This starts the loading pushers on their return stroke or pulling away from the shipping case. After they have returned far enough to clear the case, they will actuate limit valves 195, 196, respectively. Limit valve 195 will be operated by the left loading pusher cylinder and limit valve 196 will be operated by the right loading pusher cylinder. The closing of the limit valve 195 energizes the pilot operated valve 175 in opposite direction to return the bail orientor cylinder 110 to its home position, and the closing of the limit valve 196 does the same, namely energizes the pilot operated valve 176 to return the right orientor cylinder 110 to its home positon and place the respective movable sections of guide rails for the bails parallel to the main sections of the guide rails so that they are ready to receive some more cans.

It should be remembered then, that as the pushers return, they also release the star wheels (after the orientors are returned) to let two more cans move into the loading stations where the movable sections of the rails are positioned. After the loaded case has been moved, a reset circuit 201 will be operated and this will reset the relay valve 191 to its original position opening ports 192 and closing the ports 193 so that the unit is ready for another cycle. The unit will thus not recycle the pusher until the loaded case has been removed and a new case fully erected (valve 183). After reset, it will be remembered that as soon as the star wheel has passed the two cans and has again moved to its dwell position, the limit valves 161 and 162 will be closed. When the cans have backed up on the conveyor again, the limit valves 66L, 66R will be closed and after a time delay, which is sufficient to permit the pushers to go to their home position and close the limit valves 165, 166, the valves 175, 176 will again be closed causing the orientors to rotate and make the units ready to go.

If an automatic case setter is used, suitble tie-ins will be made so that the mechanism for operating the case will be actuated upon the return cycle of the loading pushers to move the full case out and set up the new case. Then, once the new case is set up, the limit valve 183 will be actuated whether it is done automatically or manually. When the new case has been set up and the orientors have turned (valves 180 and 181) the loading pushers will again be cycled.

Thus, the sequential operation of the case packer continues automatically as long as the cases are removed after they are loaded and new cases erected.

The unit conserves space and does not need complicated can grippers for rotating the cans. The movable guides are positively rotated. A further feature is that the cases load much more easily than when an entire case load is segregated and all four cans are inserted into the case from one side. Here the cans have to slide into the case only half way. At the same time cans are coming into the case from both sides. The forces on the case tending to cause the case to slide one way or another are balanced by the cans coming in from the opposite direction. The case loading is easier, more positive, and it requires less power to load the cases and less mechanism to hold the case during loading.

What is claimed is:

1. In a machine for arranging cans having bails secured in oppositely projecting bail ears for loading into cases, means for conveying a plurality of cans in a first direction with their bails lying in planes substantially parallel to said direction, means for separating out a selected number of cans from the plurality of cans, and means acting on the bails of said selected number of cans for rotating said selected number of cans about their upright axes to orient the bails and bail ears in predetermined positions.

2. The combination as specified in claim 1 and means for shifting said selected number of cans transversely to said first direction out of the path of travel of said plurality of conveyed cans.

3. The combination as specified in claim 1 wherein there are means for separating the plurality of cans into two spaced apart conveyor lanes and said means for separating out a selected number of cans selects at least two cans from each conveyor lane, a shipping case of size to hold the selected number of cans positioned between said conveyor lanes, and means for moving said cans from each lane transversely thereto into said shipping case after the cans have been rotated about their upright axes.

4. The combination as specified in claim 1 and means guiding said bails in upright planes parallel to the direction of travel of each of said cans, said means for rotating said selected number of cans about their upright axes comprising short sections of said bail guide means which are rotatable to in turn rotate said selected number of cans individually about their upright axes.

5. The combination as specified in claim 3 wherein said means for separating out said plurality of cans comprises wheel means adjacent each conveyor lane and rotatably driven by cans moving past said wheel means, latch means for holding the wheel means to prevent rotation thereof, and means to disable said latch means whenever the selected number of cans have been moved transversely to said first direction and to retain said latch means disabled until another selected number of cans have moved past said wheel means.

6. The combination as specified in claim 5 wherein said means to disable said latch means comprises an actuator member carried by said means for shifting said selected number of cans transversely to said first direction, said actuator member being operable to disable said latch means as said actuator member moves toward a home position after the cans have been moved transversely to said first position.

7. The combination as specified in claim 2 wherein said means for shifting said selected number of cans transversely to said first direction comprises a pusher assembly aligned with said selected number of cans, an air cylinder operably associated with said pusher assembly and control means for said air cylinder, said control means including means to sense when said cans have been rotated about their upright axes to orient the bails and bail ears to predetermined positions, and thereupon actuate said air cylinder to move said pusher assembly transversely to said first direction.

8. The combination as specified in claim 7 wherein said air cylinder returns the pusher assembly to a home position upon completion of its movement necessary to shift said cans transversely to the first direction, and second control means for operating said means acting on the bails of said selected number of cans, said second control means being operable to actuate said means acting on the bails of said selected number of cans after said pusher assembly is in its home position only.

9. In a machine for packing a plurality of cans having wire bails thereon into cases, said cases holding four cans, first and second conveyor means each for conveying a plurality of cans in a row and in a first direction, said first and second conveyor means being transversely spaced apart, means for holding the bails of said cams in an upright position with the planes of the bails parallel to the first direction, segregating means for alternately stopping each row of cans, said segregating means being releasable to permit two cans from each row to be moved in said first direction, means for retaining said two cans from each row that have been released in a loading station on each conveyor, a separate bail guide for each can in said loading station, means mounting each of said separate bail guides in said loading station for movement about an upright axis substantially coincidental with the axis of the can in that bail guide, means for rotating each of said separate bail guides in said loading station about their axes to position the bails and bail ears of the associated cans at a preselected angle with respect to said first direction, an open ended shipping case positioned between said loading stations, means to move said cans from each of said loading stations on each of said conveyors toward the shipping case in direction transverse to the first direction, and means to guide said bails downwardly against the sides of said cans as they are moved transversely to said first direction.

10. In a machine for properly orienting cans having bails and bail ears for loading into cases, separate conveyor means for conveying cans in a pair of parallel rows in a first direction, means for guiding said bails above said cans and in a plane substantially parallel to the direction of movement of said cans in each lane, counting means for holding each lane of cans stationary and alternately letting a predetermined number of cans move past said counting means, means defining a loading station in each of said lanes, bail guide means in said loading stations separated into individual segments, one holding the bail of each of said cans in the loading station in upright position, means for rotating each of said individual segments about an upright axis and thereby rotating an associated can about its upright axis, a shipping case positioned between said lanes and aligned with said loading stations, said shipping case being open at each end to receive cans from said loading stations, separate loading pusher means for moving the cans from each of the loading stations toward the shipping case, means to guide said bails downwardly toward the sides of said cans as they are moved by said loading pusher means, means to retract said loading pusher means to their initial position, means to return said individual segments to position aligned with the bail guide means, and latch means for said can counting means in each of said lanes operable upon partial retraction of said loading pusher means to permit the preselected number of cans to move past said counting means and thereafter again hold the cans in said lanes until subsequent operation of said loading pusher means.

11. The combination as specified in claim 10 wherein said means for guiding said bails against the sides of said cans comprise a separate member mounted for movement with each of said loading pusher means, each member having a pair of fingers pivotally mounted thereon about substantially upright axes, cam means for spreading said fingers so that each finger engages one of said bails after said loading pusher means has moved into contact with said cans, and second cam means to drop said fingers downwardly after the bails have moved away from the corresponding individual bail guide segments.

12. The combination as specified in claim 11 wherein said separate members mounted for movement with said loading pusher means are positioned so that the fingers on each member are between the cans in the corresponding loading station, and wherein the fingers spread outwardly so that each finger engages the bail of one of the cans in the loading stations simultaneously.

References Cited
UNITED STATES PATENTS

| | | | |
|---|---|---|---|
| 3,136,105 | 6/1964 | Eckhoff | 53—247 |
| 3,209,512 | 10/1965 | Ferguson et al. | 53—159 X |
| 3,289,810 | 12/1966 | Iannucci | 53—61 X |
| 3,389,778 | 6/1968 | Kovacs et al. | 198—33 |

THERON E. CONDON, Primary Examiner

R. L. SPRUILL, Assistant Examiner

U.S. Cl. X.R.

53—52, 167, 247; 198—33, 34